Patented Aug. 2, 1927.

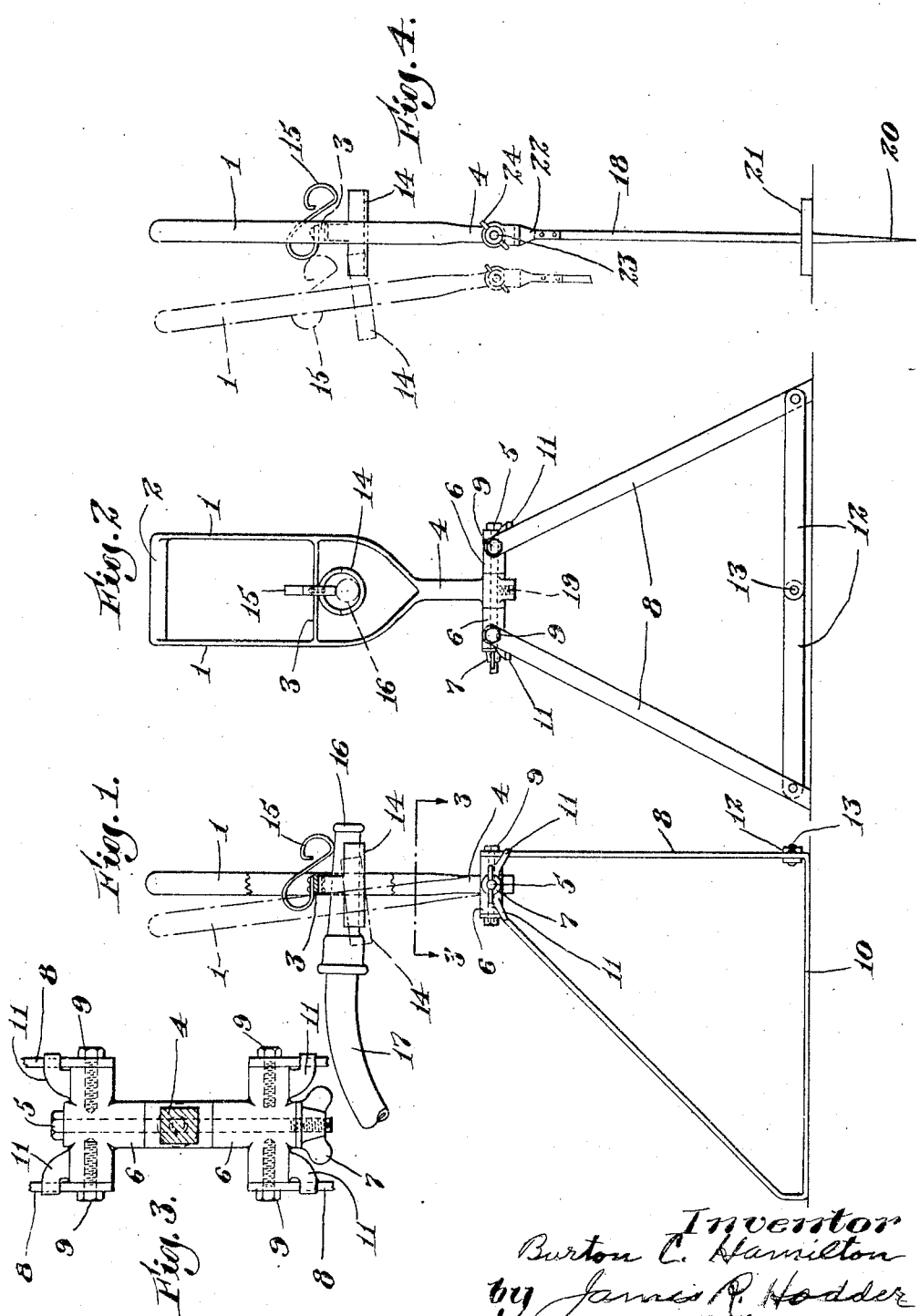

1,637,523

UNITED STATES PATENT OFFICE.

BURTON C. HAMILTON, OF BROOKLINE, MASSACHUSETTS.

GARDEN-HOSE SUPPORTER.

Application filed September 28, 1926. Serial No. 138,209.

My present invention relates to hose supporters, and more particularly to such supporters adapted to hold the nozzle of a garden hose during sprinkling or watering.

An important object of my present invention is to provide a device of this character which will be simple and economical to manufacture, and easy to operate, and to construct the same with a sturdy structure, capable of withstanding long usage and wear.

A further object of the invention is the provision of such a garden hose supporter so constructed as to cause a minimum amount of damage to the lawn or garden being sprinkled.

I have also devised a supporter with a great range of adjustability, and one which may be quickly changed or turned to any desirable vertical or horizontal adjustment, when desired.

Such a device is extremely efficient for ordinary household use, where it is desired to work on one part of the lawn or garden while sprinkling another part. My novel apparatus is so constructed and arranged as to allow the operator to approach it from the rear without danger of getting wet, and may be adjusted or carried to any desired position without shutting off the water supply to the hose.

I believe that my present invention is novel, and I therefore claim the same broadly herein.

Further features of the invention, novel combinations of parts, and advantages, will be hereinafter more fully pointed out and claimed.

Referring to the drawings, illustrating preferred embodiments of my invention,

Fig. 1 is a side elevation of the same, illustrating in dotted lines one range or position of adjustability;

Fig. 2 is a front elevation of same;

Fig. 3 is a plan section on the line 3—3 of Fig. 1; and

Fig. 4 is a side elevation of a modification.

As shown in the drawings, my novel garden hose supporter comprises a main body portion 1 having a handle 2, cross-rib 3, and downwardly depending stem 4, all preferably formed as integral parts of the portion 1, which may be and preferably is, cast as a unit. The handle 2 is preferably formed rounded, for convenience in carrying and adjusting.

The entire body portion 1 is adjustably mounted on a bolt 5 extending through T-members 6 and through the enlarged lower end of the stem 4, a wing nut 7 being provided to permit adjustment of the body portion 1 to any desired angle. Secured to the arms of the T-members 6 are supporting frames or legs 8, preferably formed as single pieces, and attached to the arms of the T-members 6 by bolts or the like 9, said supporting legs 8 having their ground contacting sides 10 flat, for even positioning on the lawn or the like being sprinkled or watered.

Limiting stops 11 are provided, preferably as integral parts of the T-members 6, to prevent the supporting frames or legs 8 from spreading open too far. A collapsible reinforcing brace 12 is also provided at the bottoms of the legs or frames 8. The brace 12 is collapsible at its center, as clearly illustrated at 13, when it is desired to fold the supporter. Attached to the rib 3 of the body portion 1 is a hose nozzle supporter 14 and a spring 15 superposing the same. The nozzle supporter 14 is formed troughlike, as clearly shown in the drawings, and is adapted to receive the nozzle 16 of a hose 17, see Fig. 1. The flange on the outer end of the nozzle 16 forces the spring 15 upwardly and permits the entrance of the nozzle through the nozzle supporter 14 and spring 15, whereupon the tension of the spring downwardly will prevent displacement of the hose or nozzle until it is desired to remove same. Means are provided, comprising a loop or ring at the end of the spring 15, for insertion of the finger and raising of the spring to permit withdrawal of the nozzle.

It will thus be seen that 1 have devised an extremely simple, efficient, economical, and desirable garden hose supporter, one capable of ready assembling and instant adjustment, with a minimum number of working or moving parts, and one which also can be operated by unskilled labor.

I believe that such a garden hose supporter is novel, and therefore claim the same broadly herein.

In Fig. 4 I have illustrated a modification of the supporting means, wherein the T-bars 6, bolt 5, legs or frames 8, etc., have been removed, and a rod 18 secured to the stem 4 by arms 22, bolt 23, and wing nut 24, or may be threaded into the threaded recess 19 in the bottom of the stem 14. This rod or stem 18 can be of any desired length and is preferably pointed as illustrated at 20 for ease of penetration into the ground. A washer or disc 21 is provided at a predetermined point on the rod 18 to prevent said rod penetrating too deeply into the ground, and also to act as a brace, support, and steadying means. Otherwise my hose supporter illustrated in Fig. 4 is exactly identical to that illustrated in Figs. 1 and 2. The angle of the body portion 1 and hose nozzle 16 may be adjusted, changed or varied by adjusting as shown in dotted lines in Fig. 4.

I believe that this form of my invention is also new, and therefore claim the same herein.

The form illustrated in Fig. 4 is also capable of rotative movement throughout the entire circle, for adjustment in any direction.

While I have necessarily described my invention somewhat in detail, it will be appreciated that I am not limited thereto, but may vary the size, shape and arrangement of parts within reasonably wide limits without departing from the spirit of the invention.

My invention is further described and defined in the form of claim as follows:

A hose supporter of the kind described, comprising a body portion adjustably mounted on a support, a handle at one end of said body portion, a rib in said body portion, hose receiving and supporting means and a hose retaining spring affixed to said rib, and means to permit adjustment of said body portion.

In testimony whereof, I have signed my name to this specification.

BURTON C. HAMILTON.